Sept. 11, 1934.　　　　R. STAR　　　　1,973,670
WATER MOTOR
Filed April 14, 1933　　　3 Sheets-Sheet 1
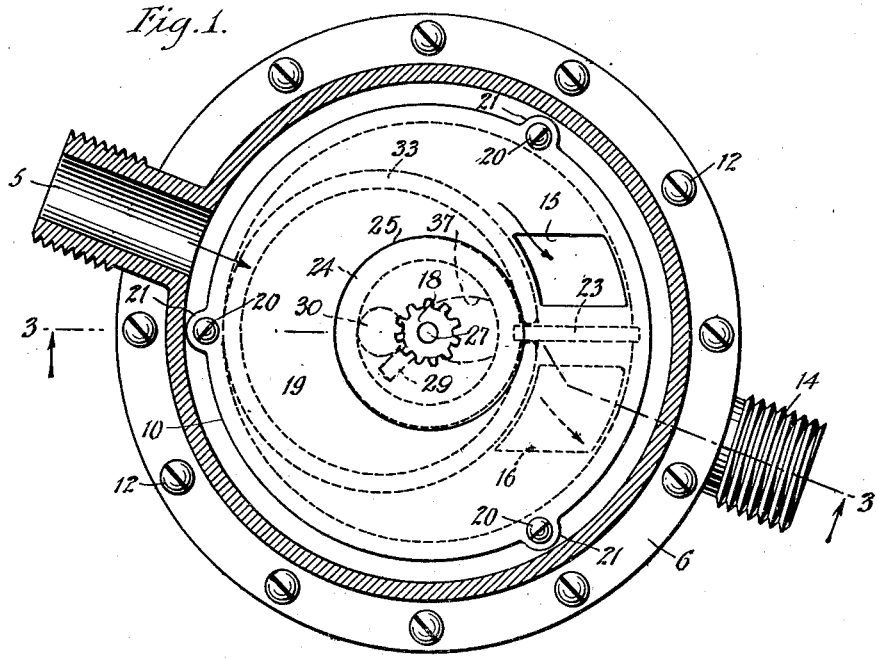
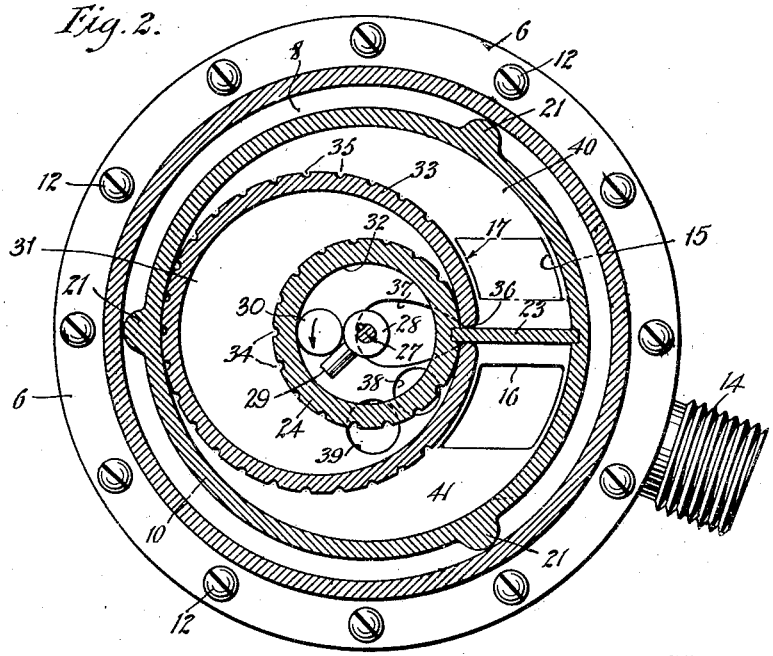
WITNESSES
Edw. Thorpe.
A. L. Kitchin.
INVENTOR
Richard Star
BY
Munn, Anderson, Stanley, Foster & Liddy
ATTORNEY Sept. 11, 1934.        R. STAR         1,973,670
WATER MOTOR
Filed April 14, 1933        3 Sheets-Sheet 2
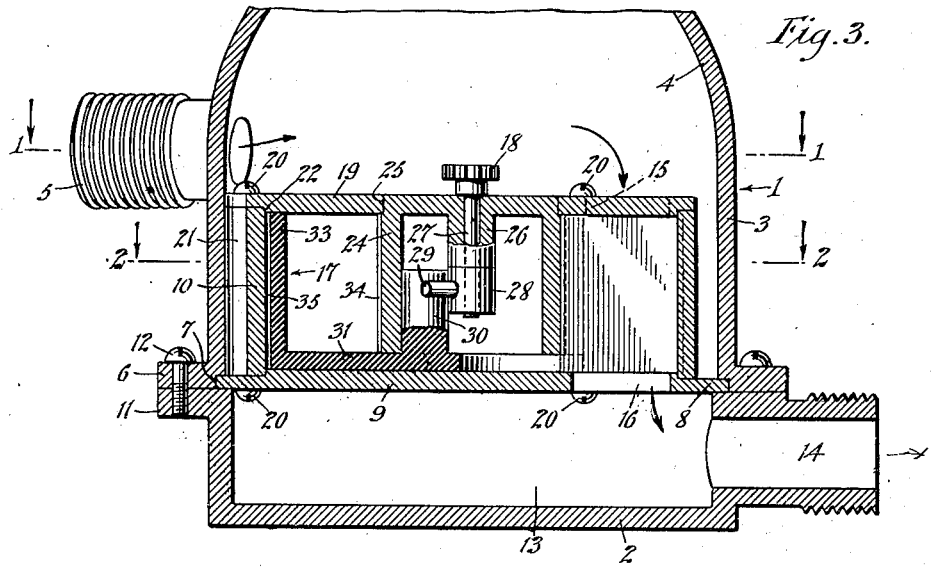
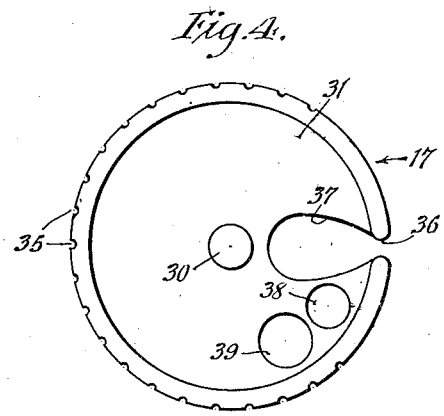
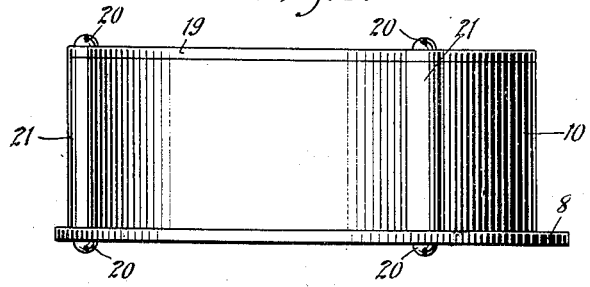
WITNESSES
INVENTOR
Richard Star
BY
ATTORNEY Sept. 11, 1934.  R. STAR  1,973,670
WATER MOTOR
Filed April 14, 1933   3 Sheets-Sheet 3

INVENTOR
Richard Star

Patented Sept. 11, 1934

1,973,670

UNITED STATES PATENT OFFICE 1,973,670

WATER MOTOR

Richard Star, Brooklyn, N. Y.; Frank Kruth, administrator of said Richard Star, deceased Application April 14, 1933, Serial No. 666,200

5 Claims. (Cl. 121—68)

This invention relates to an improved liquid meter which may act also as a motor, the object being to provide a construction which will function accurately and continuously either in clear or in muddy water.

Another object of the invention is to provide a water motor which will function continuously in water containing mud, gritty matter or other foreign substances.

A still further object of the invention is to provide a water motor of the planetary type wherein means have been provided to take care of grit or other foreign matter and thereby permit the parts to function continuously notwithstanding the foreign matter in the water being used.

An additional object of the invention is to simplify the construction of the entire motor and at the same time to cause the motor to operate more smoothly over long periods of time.

In the accompanying drawings—

Figure 1 is a horizontal sectional view through Figure 3 on the line 1—1, the same disclosing a water motor illustrating an embodiment of the invention;

Figure 2 is a sectional view through Figure 3 on the line 2—2;

Figure 3 is a vertical sectional view through Figure 1 on the line 3—3;

Figure 4 is a top plan view of the piston shown in Figure 3;

Figure 5 is a side view of the motor casing shown in Figure 3;

Figure 6:
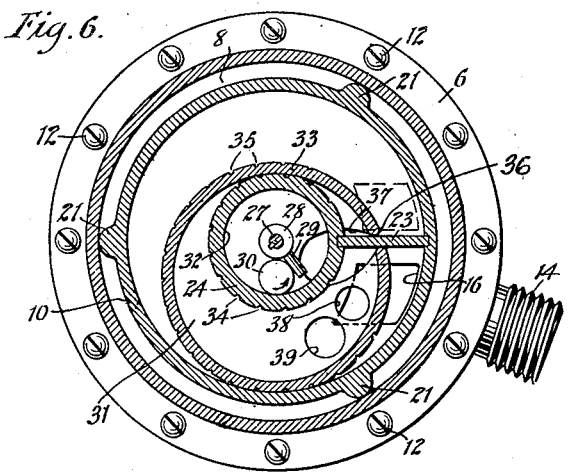
Figure 6 is a view similar to Figure 2 except on a reduced scale and showing the parts in an advanced position of 90°.

Referring to the accompanying drawings by numerals, 1 indicates the motor housing, and 2 the outlet housing. As the device may be used either as a meter for measuring liquids or as a motor for securing power from liquid and using it to drive various devices, the term "motor" used in this specification will be intended to cover the motor structure which may be used for operating the meter attachment or for operating other devices. The housing 1 as shown in Figure 3 has a tubular portion 3 merging into a dome 4, which acts as an inlet chamber in free communication with the inlet member 5. The housing 1 is provided with an annular flange 6 having an annular rabbet or recess 7 into which the flange 8 of the bottom plate 9 of the motor housing 10 fits.

The outlet housing 2 is also provided with a flange 11 whereby the various screws 12 may clamp the flanges 6 and 11 together, and at the same time pinch flange 8 in the rabbet 7, thus firmly holding the motor in position. It will be understood that the parts are so proportioned that flange 8 is gripped tightly when the screws 12 are tightened. When the parts are thus clamped in position and arranged as shown in Figure 3, water flowing through the inlet 5 will pass into dome 4, thence through the motor, finally into the chamber 13 and thence out through the outlet 14. Where gritty matter, mud or the like are present in the water this arrangement is very desirable because any foreign substances which may temporarily lodge in any part of the motor will eventually be washed out and caused to move downwardly into chamber 13, and from thence out through the discharge member 14. Where clean water is being used as, for instance, when the device is used as a meter for a drinking water supply, it is immaterial whether the water enters the motor from the top or the bottom, but where the device is being used as a motor and sometimes the water may be muddy or filled with some foreign substance, the arrangement as shown in Figure 3 is very desirable as it permits the motor to function continuously and evenly, notwithstanding the foreign substance in the water. As the device functions water will flow from the dome 4 through the inlet opening 15, as shown in Figure 1, then downwardly into the motor cylinder 10 and eventually out through the outlet opening 16. In the passage of water from the inlet 15 to the outlet 16 it causes the piston 17 to function, namely, to swing to one side and then back to the other side in a planetary movement.

This planetary movement is translated into a rotary movement of pin 30 which is communicated to the gear wheel 18 whereby power may be taken therefrom at any time. The broad plan of the motor is similar to water meters now in common use as far as the oscillation of the piston 17 is concerned, but this piston is constructed specially and presents certain new points, while the various parts coacting therewith also present certain new points. This piston is arranged to planetate freely but without appreciable lost motion between the bottom plate 9 and the cover plate 19, which cover plate is held in place by the various screws 20 which extend through the cover plate and into suitable threaded apertures in the various enlargements 21. In forming the cover plate it will be noted that the same is offset at 22 so that it will project slightly into the housing 10. The same is true of the plate 9 whereby a tight waterproof fit is easily secured. An aperture or inlet 15 is formed in plate 19 and the outlet 16 is formed in plate 9, said inlet and outlet being on opposite sides of the division plate 23 which is rigidly connected to the housing 10 and to a tubular post 24. Post 24 is reduced at the upper end and said upper end is pressed into the aperture 25 in plate 19, the fit being sufficiently tight to rigidly hold the parts together substantially as if they were one piece. Post 24 as shown in Figure 3, is provided with a downwardly extending sleeve 26 in which the rotatable shaft 27 is mounted, said shaft at one end being connected to the gear wheel 18 and at the other end to a collar 28. An arm 29 is rigidly connected with the collar 28 and is adapted to be engaged and moved by the pin 30 which is shown as being integral with the bottom or web 31 of the piston 17.

This pin is arranged at the center of the piston 17, as shown in Figure 4, and is adapted to travel in a circle and consequently rotate the collar 28 and the shaft 27. Pin 30 does not rotate but, in a certain sense, scrapes around in a circular path and slidingly engages the inner surface of post 24. As a matter of fact, the only place where the pin 30 engages the collar 28 is near the point where the pin 29 enters the collar. Pin 30 remains constantly in the position shown in Figure 2, as far as the collar 28 and pin 29 are concerned, but while in this position relative to collar 28 and pin 29 it moves in a circle as the piston functions. This construction presents a very small wearing surface, as shaft 27 is of very small diameter and consequently allows a very sensitive action of the piston when functioning. The inner surface of the wall 33 is smooth, while the outer surface of post 24 is provided with a number of vertical grooves 34 adapted to receive grit or other foreign matter whenever necessary and when the inner surface of wall 33 presses against post 24. Wall 33 extends upwardly and lightly touches the end surface of plate 19, while the bottom or web 31 rests on plate 9 and thus presents a large bearing surface which will permit easy action to the various parts but which will not readily wear. If the piston 17 was inverted and the parts were supported on the edge of wall 33, the wearing action would be considerable and would result in looseness of the parts, but by reason of the large contact surface of the web 31 the wearing action is negligible for a very long time. The outer surface or periphery of wall 33 is provided with a number of grooves 35 similar to grooves 34, said grooves coacting with the inner surface of the housing 10 to take care of gritty matter or other foreign substances.

As the piston functions it will slide and roll slightly but always in contact with some part of the inner surface of housing 10. In case a piece of gritty matter attempts to get between the piston and the inner surface of housing 10, such gritty matter will be forced into one of the grooves 35 and thus be prevented from stopping or slowing down the piston. As the piston moves further the gritty matter is released and is washed out so that it will flow out of the motor along with the water. By reason of the grooves 34 and 35 the parts will function accurately and continuously with a smooth motion in clean water or water having appreciable mud or foreign matter.

It will be seen from Figure 2 that the piston 17 is provided with a slot or opening 36 as is usual with pistons of this kind, whereby it may slide back and forth on the division plate 23 as the piston planetates. The web 31 is provided with an opening 37 for accommodating the division plate 23 and, in addition, with openings 38 and 39 for augmenting the opening 37 so as to permit the water to flow more freely into and out of the piston 17 as the device planetates. The flow of the water acts part of the time on the exterior of the wall 33 and part of the time on the interior of the wall for causing the piston to move. While the incoming water is acting on the interior of wall 33 the water exterior thereof is exhausting, and when the incoming water is acting on the exterior of wall 33 the water interior of the piston is exhausting therefrom.

It will be understood that the device functions broadly in a similar manner to planetary motors of this kind and that the inlet water from dome 4 fills chamber 40 and forces the piston 17 counterclockwise as shown in Figure 2. This movement is continued until the piston is in a position substantially diametrically opposite that shown in Figure 2. As it approaches this position water enters the piston through the opening 37 and eventually the piston gradually moves back from the chamber 41 until it is in its first position. This planetating or back and forth movement and also the up and down movement as far as the plate 23 is concerned is such that the pin 30 will move in a circle, there being only one circle described upon each complete cycle or action of the piston. The downward movement of the inlet water gives a limited circulation in a downward direction as the outgoing water passes through the lower opening, namely, the passageway 16. This produces, in a limited sense, a washing action to cause any foreign object to be dislodged and forced out of the motor.

Figure 7:
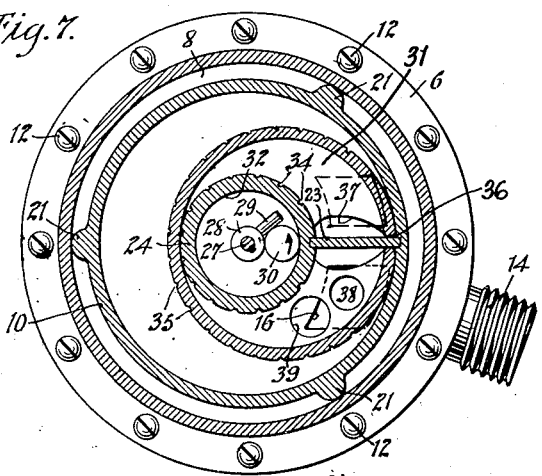
Figure 7 is a view similar to Figure 6 but showing the parts in a further advanced position of 90° from that shown in Figure 6.
Figure 8:
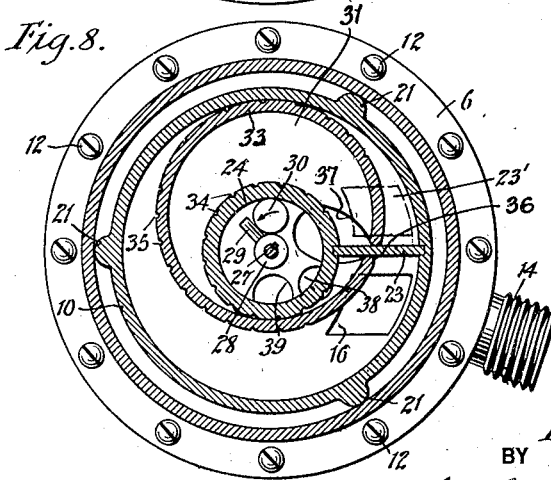
Figure 8 is a view similar to that shown in Figure 7 but showing the parts in a 90° advanced position.

In operation the motor functions to move the pin 30 in a circle and to rotate the pin or shaft 27 from which power may be taken to be used in any desired manner. Though pin 30 moves in a circle the piston 17 in effect oscillates. This piston cannot move in a circle in view of the plate 23 but as it oscillates the center thereof, namely, the center of web 31, which merges into the pin 30, moves in a circle and therefore a rotary movement is produced by the oscillatory action of the piston. Assuming that the motor is in the position shown in Figures 1 and 2 and water under some pressure is turned on, the motor will begin to function. As water enters the inlet 5, as shown in Figure 1, it will fill the dome 4 and then will pass downwardly through the opening 15, as shown in Figure 1, and in dotted lines in Figure 3, it being understood that Figure 3 shows the parts in the same position as disclosed in Figure 1. After the water has filled chamber 40 (Fig. 2) it will begin to exert pressure on the walls of the chamber and the only thing which can move is piston 17, so that this piston will swing downwardly as viewed in Figure 2 with the pivotal point sliding along the division plate 23, though pin 30 will move in a circle. The water entering chamber 40 cannot escape when the parts are in the position shown in Figure 2 and, consequently, all the pressure thereof is brought to bear on the piston which swings downwardly as viewed from Figure 2 until the parts assume the position shown in Figure 6, which may be termed the second position and wherein the parts are shown in a position 90° from that illustrated in Figure 2. When the piston swings from the position shown in Figure 2 to that shown in Figure 3, if there is any water in chamber 41 it will flow through outlet 16. Also, as the parts move to the position shown in Figure 6 the wall 33 near the opening 36 will gradually move into and then across the inlet opening 15. When the parts are in the position shown in Figure 6 some of the inlet water is passing into chamber 40 and some into the interior of the piston. The piston will continue to move and as it moves from the position shown in Figure 6 it will gradually assume the position shown in Figure 7 which is 90° from that shown in Figure 6. When it reaches the position shown in Figure 7 practically all of the water passing through the inlet opening 15 will be discharged into the interior of wall 33, namely, into the piston, whereupon the water will react against one surface of the division plate 23, part of post 24 and part of the interior of wall 33, whereupon the piston will continue to move until it assumes, for instance, the position shown in Figure 8 which is 90° from that shown in Figure 7. When the piston reaches the position illustrated in Figure 8 a large portion of the entering water will pass into the space 23' which is part of chamber 40 and, consequently, the pressure will continue to swing the piston so that it will move from the position illustrated in Figure 8 to that shown in Figure 2. This completes one complete circle of movement of the various parts and in this movement there is a form of oscillation to the piston and a movement of pin 30 in a circle as this pin slides around the inner surface of post 24. It will be understood that in the operation of the motor the movement of the piston is continuous and uniform if the pressure of the water is uniform.

I claim:—

1. In a water motor of the planetary piston type, a piston formed with a ring open at one point and a web at one edge of the ring forming substantially a bottom except adjacent said opening, said web being provided with an upstanding pin which is positioned centrally of the ring, said ring being provided with a plurality of grooves on the outer surface adapted to receive foreign matter when the piston is functioning a housing enclosing said piston and a bottom plate engaging said web and supporting said piston, substantially the entire surface of said web being continually engaging said bottom plate.

2. In a water motor of the planetary piston type, a motor housing having an inlet and an outlet, a dividing plate arranged between said inlet and said outlet, a tubular piston having an opening, said opening being positioned so that the dividing plate may extend therethrough continually, said piston having a bottom web except adjacent said opening, said bottom web acting as a supporting bearing plate a pin extending upwardly from said web, said pin being arranged centrally of the piston and adapted to move in a circle as the piston functions, a power shaft, an arm secured to said power shaft positioned to be actuated by said pin, and a tubular post for guiding said pin in its rotary path, said tubular post at one point being connected with said dividing plate.

3. In a water motor of the planetary piston type, a motor housing provided with an inlet opening and an outlet opening, a division plate arranged between said openings, a stationary post secured to said division plate, said post being hollow and arranged centrally of said housing, a cylindrical piston having a pin extending into said post and a supporting and bearing web arranged on the bottom edge said web being cut away at one point, said piston being formed with an opening at the cutaway portion of the web for accommodating said division plate, and means for transmitting power from said pin to a distant point.

4. A water motor comprising a motor casing having a solid bottom and solid sides, said bottom having an outlet opening, a cover plate for said housing, said cover plate having an inlet, a tubular post rigidly connected to said cover plate, a division plate arranged between said inlet and outlet openings and extending into the wall of said housing and said tubular post, a tubular piston having a bottom web extending beneath said post and resting flatwise against said bottom, said bottom web having a pin extending upwardly into said post, said pin being adapted to follow the interior surface of the post and move in a circle as said piston planetates, and means for transmitting power from said pin, said bottom web and the bottom of the housing fitting against each other so that the bottom web will act as a bearing for the piston.

5. A water motor of the planetary piston type comprising a motor housing formed with a bottom having an outlet opening, an annular side wall integral with the bottom, a cover plate formed with an inlet opening, means for removably securing said cover plate to said annular side wall, said cover plate having a comparatively large circular aperture at the center, a tubular post having a substantially closed end fitted tightly into the opening in the cover plate and held in place by friction, said post at the closed end being provided with a shaft carrying sleeve, a power shaft extending through said sleeve, an arm connected with said power shaft, a piston arranged in said housing provided with a pin extending into said housing and positioned to move in a circle therein so as to engage and move said arm for rotating said shaft.

RICHARD STAR.